United States Patent [19]

Novinger

[11] Patent Number: 5,368,257

[45] Date of Patent: Nov. 29, 1994

[54] VARIABLE ONE WAY AIRPORT

[76] Inventor: Harry E. Novinger, 13890 E. Marina Dr. #609, Aurora, Colo. 80014

[21] Appl. No.: 5,859

[22] Filed: Jan. 13, 1993

Related U.S. Application Data

[63] Continuation of Ser. No. 859,068, Mar. 27, 1992, abandoned.

[51] Int. Cl.⁵ ................................................ B64F 1/36
[52] U.S. Cl. .................................................. 244/114 R
[58] Field of Search .................................... 244/114 R

[56] References Cited

U.S. PATENT DOCUMENTS

| | | | |
|---|---|---|---|
| 1,850,490 | 3/1932 | Bahl | 244/114 R |
| 3,325,124 | 6/1967 | Barry | 244/114 R |
| 3,572,619 | 3/1971 | Brown | 244/114 R |
| 3,729,153 | 4/1973 | Wilde | 244/114 R |

OTHER PUBLICATIONS

"Tangent Runways", *Flight,* Oct. 21, 1943 p. 454.
"Monticule Airfields", *Flight,* Jun. 10, 1955 p. 816.
"Jet Age Runway Problem solved" *Flight* Dec. 20, 1957, pp. 963-964.

*Primary Examiner*—Galen L. Barefoot

[57] ABSTRACT

Airport structure for operating aircraft in one direction during landing, taxiing and take off in short, efficient distances. The aircraft lands on an approach runway connected to an apron. It then taxies across the apron in generally the same direction as on the runway. It departs on a runway located on the opposite side of the apron from the approach runway. Both runways are in parallel and the runways are spaced laterally in distance equal to the width of the apron. The taxi distance is the shortest possible distance measured directly between the two runways in a linear, noncircular dimension. The apron is unobstructed in this dimension by the runway connections defining the taxi passageway path between distributed aviation buildings on the apron rather than the buildings being grouped together so as to obstruct straight taxi paths. The airport members allow reciprocal path direction and the members can be duplicated around a common axis creating big airports without taxiways in the preferred configuration.

5 Claims, 1 Drawing Sheet

VARIABLE ONE WAY AIRPORT

The present application is a continuation of Ser. No. 859,068, filed Mar. 27, 1992, now abandoned.

CROSS-REFERENCE TO RELATED APPLICATIONS

Application Ser. No. 258,582, filed Oct. 17, 1988 and application Ser. No. 418,777, filed Oct. 2, 1989 both now abandoned.

BACKGROUND OF THE INVENTION

1. Field of the Invention

This invention relates to Aeronautics and more particularly to big high-capacity airports, for heavier-than-air-aircraft, which extend in size over areas much bigger than the "Landing Field" patent classification suggests; and, specifically to the arrangements of their multiple hard surfaced aircraft support members which adapt to sites much more economically than do "Landing Fields" or so called "airfields" because hills between one way airport runways need drainage grading only.

"Landing field" pertains more to the apron member of this invention than to its runway members because this invention's apron is a big level area while the runways may extend along ridges or over narrow portions of several fields far beyond the apron. The apron does not include runways but often provides taxi passageways to aviation service or facilities distributed thereon and provides direct, non-circular taxiing hard surface support between the approach and the departure runways.

Thus, this apron is integrated by uniting the usual ramp or tarmac with the aviation buildings, such as terminal area buildings, usually grouped at the side or center of the ramp in the prior art.

2. Description of the Related Art

Most all big airports are based on the old airfield concept of bunching together the runways as they expand capacity. This has resulted in parallel runways too close together for safe simultaneous approaches and departures in low visibility weather conditions; and, in use of one long parallel taxiway co-located with each runway and including several short high speed and low speed taxiways interconnecting this long taxiway to the runway so that the runways can be used in two directions.

This antiquated method of adding more runways and many taxiways results in excessive taxi distances, slowed speeds because of numerous stops and goes at the many intersections of runways with other runways, more such delays between taxiways and runways and still more between taxiways and taxiways. The more the taxiways, the more the delays and their inefficiency and the cost of taxiing, the more the radio calls. These add up for increased taxi accidents. During periods of low visibility, the flight operational capacity decreases and often stops. The delays, the workload, the confusion may extend to the enroute air-traffic control throughout a passenger hub area including several other airports and the crossing airways traffic therebetween.

Applicant has determined only a few airports, out of the over 9,000 airports in the U.S.A., are big airports. Of these big airports studied, applicant submits the most efficient one is Dallas - Ft. Worth (DFW) by studying its structural configuration.

DFW is the most recently built airport. Its structure, however, does not provide for future expansion with efficiency of operations when compared to applicant's invention. Comparisons follow:

DFW has 31.5 statute miles of taxiways and a big long apron with little use of each of its three center areas. There are no aircraft taxi passageways across the apron; thus, requiring at least 2.5 miles taxi distance from one side to the opposite side. Applicant's invention's apron taxi distance is 1.5 miles. Both aprons have about the same size areas occupied by the usual commercial and service facilities. DFW average taxi distance from the closest ends of the closest runways to average apron passenger gate is 1.1 mile compared to 0.82 mile for this invention's.

DFW average taxi distance from the farthest ends of farthest runways to average apron gate is 3.2 miles compared to 0.82 mile for this invention's. The differential results from DFW use of the parallel co-located runway-taxiway concept for two way use of each runway while this invention's one way structural configuration does not result in taxi use of distant ends of any runways. Only flight operations use applicant's distant ends. Infrequent heavy maintenance taxi use of distant ends is provided by this invention's embodiments when desirable as will be seen. The taxi distance and its cost will increase for DFW if it increases the number of its runways because they must be located farther out. Applicant's invention used twelve runways for this study while DFW uses six.

Other inefficient and costly structural characteristics of DFW compared to applicant's invention follow: DFW's over 400 intersections of taxiways with taxiways and taxiways with runways to this invention's two embodiments being zero intersections.

DFW does show two outer runways oriented much like applicant's in that they have center lines converging with others and one end of each is connected to the apron by use of taxiways disposed between the runways and apron. But one of these two runways has its closer end, to the apron, extending beyond the apron. This requires additional taxi distance, and both runways utilize the two way structures of one long high speed taxiway co-located and parallel with each runway and with interconnecting taxiways therebetween. Applicant's invention does not resort to such expensive to build, expensive to taxi upon and potentially two way dangerous structure.

Partial modification of DFW to one way structure and operations by closing 202 of its aircraft intrusive intersections of runways with taxiways and taxiways with other taxiways, and 10.5 miles of taxiways closed would decrease its taxiing distance by ⅓, taxi time by ½ and would greatly increase its safety and capacity.

A new airfield type airport requiring grading and leveling the majority of some 42 square miles of earth is under construction at Denver, Colo. This newly designed airport, twice the size of DFW, has been studied for ten years and published in the media and in official documents. Thus, applicant believes it is prior art.

Although the Denver Airport will be at least twice the size of DFW, its capacity is held by its planners as being restricted and applicant's study of this prior art shows it to be a massive assemblage of runways and taxiways of such great size that its capacity, with twice the runways of DFW, will be less than twice that of DFW. The Denver Airport will have only half the capacity of applicant's invention in periods of low visibility despite both airports having same number and size of runways. The main difference, as will be seen, is that applicant's invention doesn't use Denver's excessive and costly taxiways distances.

This prior art New Denver Airport (DEN) has a network of 90 miles of taxiways comprising more than 60 right angle turns that will slow and at times stop taxiing aircraft. It will have 525 intersections involving its taxiways with other taxiways and taxiways intersecting with its 12 runways. Of these, 108 are high speed crossings.

Based on the FAA standard for new big airports in year 2020 to handle one million landing aircraft, this complex, costly New Denver Airfield will have 46 million taxi safety risks per year involving those 525 aircraft intrusive intersections while this invention's 12 clear runways will have zero such safety risks.

This invention can land at least 4 simultaneous streams of aircraft in zero visibility while still converging from airways. Their lateral separations at landing will be at least 1.25 miles. Denver will converge only 66% of its maximum of 3 streams capacity in zero visibility and converge them to a terrifying 4,300 feet separation while still in flight and in final turns to final approach to parallel flight separation of only 4300 feet which will result in 495,000 inflight safety risks per year compared to the oneway airport in FIG. 1 having no such flight safety risks. The FAA standard will not be attained without converging runways. Parallel runways won't work.

Further problems of the prior art solved by applicant's invention, when compared with the New Denver Airport are: complicated procedural and operational requirements brought on by excessive structural members. This excess results in less operating efficiencies; 3.2 average taxi distance for DEN to 0.8 mile for this invention at FIG. 1 for a taxiing savings of $495 thousand per day based on an FAA estimate of one million aircraft each year; and, DEN will not easily adapt to the industry requirement for automated control of aircraft flight and taxi operations, while applicant's invention's simple structure will easily adapt and increase its capacity when equipped for automation. Applicant's structure's cost of construction savings is estimated, in 1987 dollars, when compared to DEN is: for the 68 extra miles of high speed taxiways, 17 miles extra low speed taxiways, leveling and preparing into one giant plane the extra 31 square miles area required by DEN in the selected site of rough terrain to meet its old "airfield" structural concept will save $1.82 billion from the over $3 billion Denver planning estimated cost of their New Denver Airport.

Converging runways are shown in prior art "tangent runways" flight article, Oct. 21, 1943, page 454, which discloses multiple converging runways intermixed with taxiways around a circular loading ramp surrounding the aviation service facility buildings. The runways intersect with other runways while applicant's invention has runways clear of other runways; and, applicant's taxi passageways directly through the middle of apron and through the distribution of facility buildings for significantly shorter passageway hard support surface structure between the approach runways and the departure runways when both airports are the same size.

Prior art BROWN, U.S. Pat. No. 3,572,619, Mar. 30, 1971, discloses a ramp surrounding facility buildings "terminal area" identical to the Blight article. Brown's runways are clear of other runway intersections but the approach and departure runways have common center lines, and Brown's runways and taxiways are off-set to one side of his ramp resulting in three times as much taxi distance structure as does applicant's taxi structure measured from the approach runway on a direct line through the facility building distribution to the departure runway. Brown's circular ramp and off-set taxiways and runways result in circular long taxi distances from one direction into the opposite direction while applicant's taxi distances are on short, direct, linear, noncircular distance structure.

SUMMARY OF INVENTION

This improvement in big high capacity airport comprises new expandable airport structure for increasing capacity by decreasing taxiing distances while comprehending great safety and efficiency in control and movement operations of multiple streams of heavier-than-air-aircraft, during their simultaneous oneway approach, taxi, and departure operations in generally the same direction involving a plurality of runways. Each stream has its aircraft longitudinally spaced therein and the streams are laterally spaced from one another except during taxiing on the apron where multiple stream paths may cross.

The geometry of the runway, taxiway and apron support member arrangements provide for directional control of each stream of aircraft during approach operations, in the approach corridor to the approach runway known as landing runway then running in the same direction directly to the apron for shorter, faster and safer distances than in the prior art. Then the aircraft turns onto the apron taxi passageway which extends through the apron's middle area and through the distribution of aviation service buildings in short, direct distance measured between the approach and the departure runways. The aircraft then transits the departure runway, the take off runway in the preferred same direction of the approach runway. The departure direction may be substantially changed if terrain prohibits construction in parallel with the approach runway.

The aircraft support members of the departure operation are arranged in reverse order to these of the approach. This provides reciprocal structure and operational function. Thus, when the wind varies to the opposite direction, the approach and departure aircraft flight direction can vary whereby the stream of aircraft transit the approach, taxi and departure in a one way path in an opposite direction too. The amount of variation corresponds to the physical variation in structure. The variation is 30 degrees in three embodiments and 90 degrees in two.

All runways are clear of intersections with other runways and also clear of taxiways in some configurations. An integrated hard surfaced apron unites the ramp or tarmac with the usual aviation service buildings, normally grouped at a side or in the center of a ramp, by distributing them on the apron in this invention so aircraft can taxi through the distribution to assigned building in direct paths.

Each pair of runways, an approach and a departure runway, is laterally spaced from one another so their substantially parallel center lines extend exterior or outside the apron distributed building area to protect the building from faulty aircraft that can't stop at the connection of runway with apron. The two runways are located on substantially opposite sides of the apron and do not have common centerlines. Each is connected to the apron preferably at exact opposite sides but difficult sites as in mountains, industrial areas, lakes may require some displacement, thus the use of "substantially opposite sides."

These big oneway airports are based on a simple embodiment of only 3 elements, a starter airport. It may comprise only one approach runway connected to as rectangular-like elongated or other shaped apron with aviation buildings distributed thereon and one departure runway connected to substantially the opposite side of apron as illustrated in FIG. 2.

The inner ends of these two runways connect the apron. The apron taxi passageway extends in one direction through the distribution of buildings in the least possible practical distance measured between the two runway connections. The aircraft paths on the three members or elements are in generally the same direction, a one way path. This 3 element airport is found in FIG. 1 which comprises six of the basic 3 element expandable airports in one big one way airport. It is more specifically in FIG. 2. Some illustrations provide for taxiways to be inserted between the runways and apron. These simple structural arrangements provide minimum taxi distances, minimum intersections of taxiways and clear type runways; runways where aircraft operate at high speed without fear of opposite traffic as in two way airfield operations whether involving arrival aircraft alternating with departing aircraft in the same direction or in opposite directions which is characteristic of the unclear two way runways of the prior art. Some embodiments provide clear taxiways as well as their runways.

This new structure provides for one way traffic flow for the same safety and efficiency purposes as for building a super highway with its plurality of one way lanes, in one general direction, for all the traffic on one side. It can be sited in rough terrain and certain built-up areas not economically viable or otherwise believed suitable for airport structure under the airfield concept which requires the entire airfield area be graded in one plane for laying their networks of taxiways and runways.

The apron's commercial service facilities may include concourses with passenger gates, at least one passenger terminal, hotel, conference rooms, cargo, minor aircraft and maintenance structures. These buildings are distributed on the apron so as to allow aircraft transit through the middle of the apron on hard surfaced apron passageways on the apron support member. They provide shortest possible one way taxi distances across the apron from the approach support surfaces to the departure support surfaces.

The main object of the invention is to provide an ethos for elimination of all dangerous, inefficient, costly two way runway and two way taxiway big airports; supplanting them with a superior big airport having at least twice their safety, efficiency and capacity at less than half their cost and of their construction time.

More specifically, this object is to provide metropolitan areas big expandable hub airport structures adaptable to locations not normally believed suitable for airfield type airports. This invention's structures with single mode of operation readily adapts to such sites. Distant siting is included by its inherent availability of having greater spaces between its runways useable for the parking of automobiles for the some 35 percent of the hub local passengers that buy tickets locally. The other some 65 percent may never leave the airport being hub non-local passengers. When emissions and noise pollution and individual automobile travel costs to and from distant airports are considered, this new airport structure is readily adaptable for substitute rapid transit as the sole exterior means of transportation for these 35 percent local passengers from the one or several local metropolitan ticket, baggage and automobile terminal and parking centers.

Another object is to provide simple big airport structure with one way aircraft traffic flow in the air and on the supporting members that is not only much safer and more efficient than the prior art; but, also provides for easier implementation of the National Automated Air Traffic Control System desired by the industry. This system, using existing technology will be including today's CAT III ILS, an automatic landing system, limited in use at existing big airports but easily used with applicant's invention. It provides safer crossings of flight paths during approach descents and departure ascents than by oral controller radio art. It will accurately reposition many separate aircraft to form multiple streams of aircraft during critical simultaneous interceptions of precision approach and landing systems. This can be as accurate as used to spot land, on the selected second, the Space Shuttle, a glider without power. This accurate automatic sequenced spacing of aircraft within streams of aircraft, with pilot over-ride, will increase safety of landing and take off behind heavy aircraft generated wake turbulence. This translates in decreased longitudinal spacing of aircraft throughout the system resulting in a much less need for present overloaded controllers, of radio usage, fewer delays and less stress on controllers and pilots. This change to a new one way mode of operation at all Terminal Control Centers, surrounding all big airports, is so fundamental to the safety and the efficiency of air traffic control that the entire national system of air traffic control, of air navigation systems, of airport structures, of aircraft and support facility design can be upgraded with efficiency of cost and will improve every other aspect of aeronautics throughout the 21st century.

BRIEF DESCRIPTION OF DRAWINGS

Other features and advantages of the invention will be apparent from the following description taken in connection with the following specification and accompanying drawings wherein.

The scale of the five illustrations vary. Their relative sizes may be measured using 2.25 statute miles as the lengths of the shorter runways within each FIG.

Figure 1:
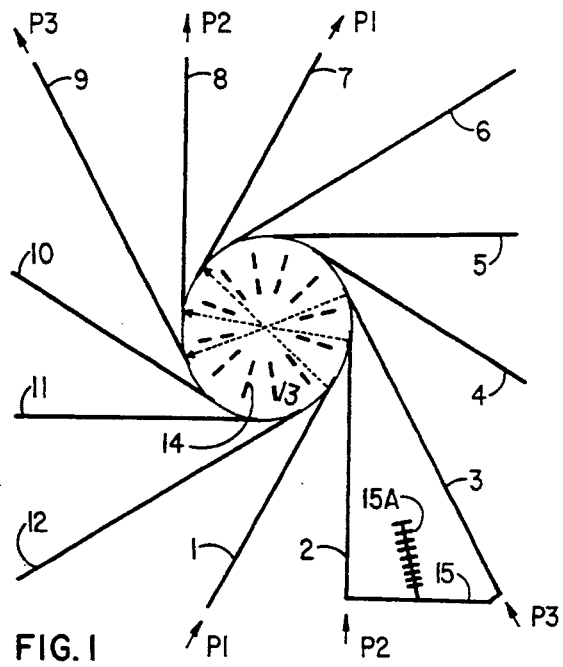
FIG. 1 is a vertical view of a schematic illustration of the big variable one way aircraft traffic flow airport with structure comprising a circular apron approximate the airport's center about which is a plurality of runways. Each runway may have its outer or inner edge tangential to the apron perimeter. The apron is designated by 13 and does not contain surface shading lines so as to better show its commercial aviation support facilities, buildings normally located at the side or in the center of ramps but in this invention integral to the apron being distributed on the apron as 14.
Figure 2:
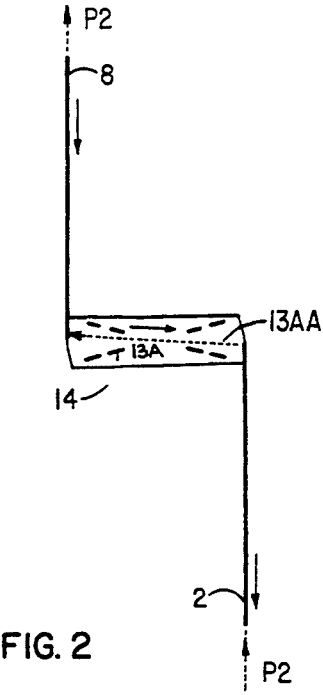

FIG. 2 is a similar type drawing being taken from FIG. 1 the basis for the entire family of one way airports. It is found in FIG. 1 with elements 2, 13, 8 and the other pairs of parallel runways. But in FIGS. 3, 4 and 5 it is represented by elements 1, 13, 7 or 4, 13, 10 with modifications.

Figure 3:
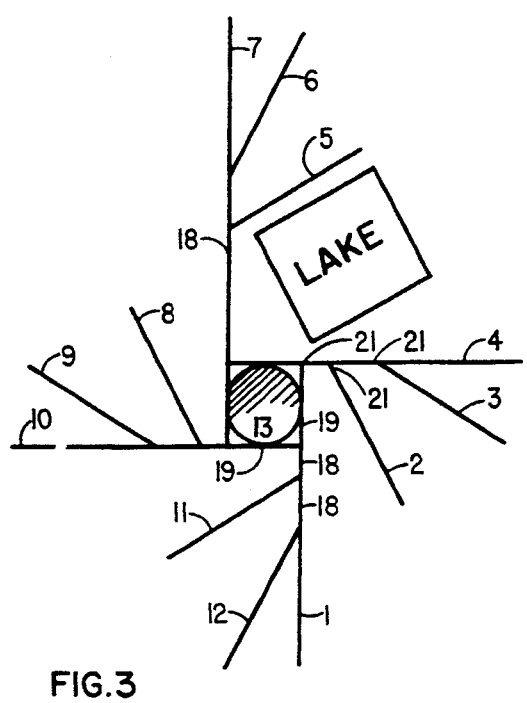

FIG. 3 is a similar type drawing of a big airport with the same operational mode of FIG. 1 based in part on the twelve directional configuration of FIG. 1 with alternative structure comprising runways and taxiways transformed to a different type site. Its taxiways can serve to extend the lengths and the displacements of four runways to areas where they can be sited.

Figure 4:
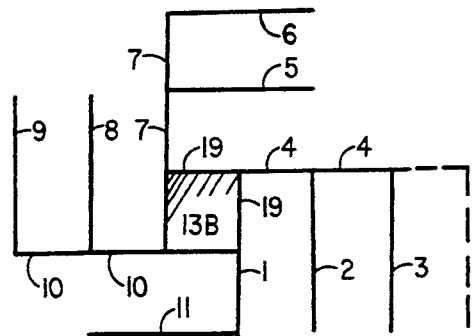

FIG. 4 is a similar type drawing of a big airport with alternative structure comprising four groups of three runways each in a four directional configuration. Of the four runways connected directly to the apron, each has double capability as a runway and as a taxiway for two other runways for economy of construction.

Figure 5:
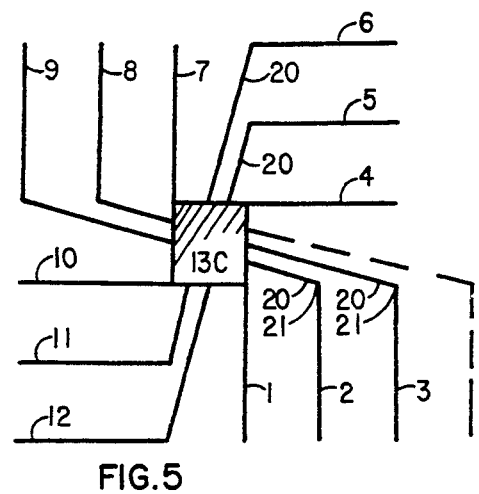

FIG. 5 is a similar type drawing of a big airport with alternative structure, based in part on the four groups of three runways each in a four directional configuration, but with the runways configured to provide space for building high speed taxiways directly interconnecting the outer lying runways with the apron.

DESCRIPTION OF THE PREFERRED EMBODIMENTS

The best mode of operation and exemplary embodiment of the invention is disclosed by FIG. 1 of the drawings. It is a vertical schematical view of its two hard surfaced aircraft supporting members designated by the numerals 1 through 12 for the runways and the centrally located apron as 13. One end of runway 1 is preferred to be connected to the apron so that its outer runway edge, its outer side is tangential to the perimeter of the apron. It also may be connected having its inner side edge tangential or substantially tangential to the apron perimeter. It may be connected to an apron with an irregular perimeter. The center line of the runway must not point at buildings 14 in event an uncontrollable aircraft lands and rolls beyond the runway end: otherwise it could slide into a building as unsafe airfield structures allow.

The sizes of each runway may be 200 feet in width and 2.25 miles in length, sizes for more accurate comparisons of costs to the prior art. The four longer runways are to show flexibility of the structure. They may have application for The Spaceplane, or a preferred choice for every runway because runways are poured instead of taxiways. This structure has no need except drainage for grading between its distantly located runway shoulders.

All runways are aligned at 30 degrees in respect to one another in FIG. 1. This provides a 12 directional airport. This angle may be increased during the first stage of construction; for example, every other runway may be left unbuilt as long as 6 directional capacity suffices. At least 18 runways may be required at some metro areas. The apron is expandable too and this will provide greater separation between runways at their connecting ends with apron 13. Any two runways may be separated more or even less when required to set on a ridge or straddle a lake or the like.

The arrow P1 at the outer end of runway 1 designates one aircraft of a stream of aircraft in the approach corridor to runway 1. It lands and runs rapidly toward the apron 13 for minimum taxi distance resulting in maximum taxi operational efficiency. It then taxies onto its taxi passageway hard surface portion of apron 13 as illustrated by the dotted line path made by P1. This line also represents the direct short distance between the ends of the pair of runways 1 and 7. The taxi passageway is arranged along both sides of this line across the apron in one direction.

After P1 docks at its gate or other building 14, it may taxi to the opposite side of the apron 13, from which it came, to a departure runway oriented into the wind. This runway may be runway 7, a runway parallel to the landing runway 1 or any other runway that is into the wind and is deemed to be safe as lying in the one way concept within which three streams of aircraft are at this time operating. The arrow P1 at the outer end of runway 7 shows the aircraft after take off and flying straight out in its departure controlled corridor.

The apron 13 is at least one mile in diameter so as to meet FAA 21st century standards. P1 can transit the apron on this diameter from one side of the apron to its opposite side and from runway 1 to runway 7 inner ends in this shortest possible distance being noncircular, direct, linear one direction on the taxi passageway portion of the apron member 13. The actual path of P1, in this big airport with many buildings distributed on the apron, may be assigned to off-load or service at any building but the structure of the apron is shaped for taxiing in shortest distance possible, in one direction from approach runway to departure runway. Besides the passenger activities on apron 13, there are buildings for lodging, mail, freight, a terminal with central shopping and conference rooms, and minor aircraft maintenance facilities as required. These buildings are arranged so as to define aircraft passageways across apron 13 for transit of aircraft across the apron in minimally short distances measured between the landing and take off runway ends connected to the apron. The dotted lines designate three of the passageway paths as well as the distances of the passageway portions of the apron member.

Another aircraft stream, designated by arrow P2, is controlled by the arrangement of its assigned runways in generally the same directions as the first stream. A third stream is designated by arrow P3. This structure can handle additional streams in simultaneous one way operations. There are no intersections or crossings involving any runway in FIG. 1, and there are no taxiways involved for great safety, efficiency and capacity. As with the changing from one lane to another on a one way highway, the aircraft flow in a one way operational mode along the approach, the taxi and the departure operations. Only on the apron 13 passageways, at low taxi speeds, do they cross and change their paths in respect to one another; but the one way mode of operation still is maintained. There is no movement in opposite directions as in the two way mode of operations common to the two way parallel co-located runway-taxiway combinations in the prior art.

When the wind changes and its strength requires a change in aircraft operating direction, this one way mode also changes so as to fly aircraft into the wind. If the wind changes to the reciprocal of its first direction, which is a variation of 180 degrees, so does the one way aircraft mode of operation. It is variable every 30 degrees. The novel structure of this invention's hard surfaced aircraft supporting members are disposed in respect to each other so as to be interchangeable in function for reciprocal directions of aircraft operations. This allows all the approach runways to also be departure runways, as when P1 lands on runway 7 and taxies to runway 1 for departure, if the wind and other one way traffic permits it.

At least four streams of aircraft, spaced to land four every two minutes and the same number must depart, will be required at these U.S.A. big airports by year 2020 with the busier ones estimated to reach this amount, by FAA, earlier. The four directional structures in FIGS. 4 and 5 provide for 3 streams and they have expandable characteristics for more streams. It may be possible to land this amount using those 3 stream structures with the National Automated Air Traffic Control System, addressed in above objects provided wake turbulence can be tamed by sequential spacing and by separating heavy aircraft from other streams.

Taxiway 15 is a major-maintenance taxiway interconnecting the outer ends of any pair or pairs of runways for less construction cost. Taxiway 15A connects the maintenance facilities to 15. This heavy activity has no place on apron 13 because of its noise and emissions pollutions and industrial hazards. These taxiways are service types in width and strength, thus economically built. They may not be required at all airports or on all pairs of runways. The minor maintenance is located on apron 13 where it belongs in service building 14.

Most, if not all big airports have projected converging or crossing runway center lines similar to the illustrations of this invention. When they do, they must have missed approach procedures in event two or more aircraft on simultaneous instrument approaches declare such emergencies. Applicant's simple mode of operation will result in easy application of automated control which will assure approach separation of all closely spaced aircraft so that in the very rare event two or more aircraft simultaneously miss their approaches they already will have adequate separation at convergence of flight paths. Until then, emerging aircraft avoidance system, local approach radar, taxi radar and simplex radio operation with at least CAT III approach and landings will result in few such emergencies and much better control.

FIG. 2 illustrates a 3 element "starter" variable one way little airport which forms the basis of the family of one way expandable airports described in this invention.

This basic configuration was lifted out of big airport in FIG. 1 taking the pair of vertical runways 2 and 8 and their elongated portion of apron 13; however, a like apron portion and connecting pair of parallel runways in FIG. 1 would do. Multiply the airport in FIG. 2 six times while rotating 30 degrees about a common axis so as to superimpose any overlap of the elongated or other serviceable shaped apron will duplicate the airport illustrated in FIG. 1.

FIG. 2 forms the elements 1, 13, 7, or 4, 13, 10 in FIGS. 3, 4 and 5; and those FIGS. contain certain modifications as will be seen. Aircraft P2 transits the apron path to runway 8 via the dotted line 13AA on apron 13A. The reciprocal path is shown by the solid arrows.

FIG. 3 illustrates an alternative structure of the invention of FIG. 1 wherein 12 runways are aligned at 30 degrees or any other converging angle suitably operational. The apron 13 may be circular or any other efficient shape for minimum taxi distances across it and with portions of its edge tangential to its four taxiways designated by 19. The taxiways 18 can be used as runway extensions of runways 1, 4, 7, and 10 when not used as taxiways. These taxiways 18 may be used to further displace runways as shown by taxiway 18 extending the runway group to the other side of the lake, around a hill or industrial area where two way airfields can't be sited.

FIG. 4 illustrates an alternative form of structure to the three preceding illustrations by its decreased number of approach and departure directions of 12 down to 4 and by its grouping of runways in parallel, three in each group. In addition, this four directional configuration results in the extensive 90 degrees change in approach and departure operations.

This change will be no problem in light winds but can seriously impede and even stop all arrival air traffic when airport cross-wind capabilities are exceeded for landings. Its parallel runways may be increased by adding additional ones and its apron 13B may be rectangular or any other shape that will meet the concept of this invention, even expandable at least one half mile in all directions without affecting runway use. Its parallel runways do not provide the safe separations during interceptions of its instrument landing systems, in low visibility, that is provided and addressed in the earlier illustrations.

The basic variable one way aircraft operating mode of the earlier illustrations is retained. These parallel runways, once the aircraft are on their precision approach landing systems, do direct their aircraft straight ahead on missed approaches. This has been one of the primary design requirements in prior art planning of airports.

Runways 1, 4, 7, 10 have secondary use as taxiways by those runways having one end of each connected thereto. This double use is cheaper to build and is substantially as efficient as the illustration of FIG. 5; but, is not as safe as the unobstructed, single use, non-intersected and clear runways and taxiways of FIG. 5. The apron is designed as 13B being shaped differently than the earlier aprons. It still functions as the others with the same efficient, short taxi distances. Taxiways 19 are tangential to 13B and can be used as extensions of runways 1, 4, 7, 10 when 3 mile runways are necessary and special care is provided for the high speed in this tangentially connection with the apron. Otherwise, all runways here are shown as 2.25 statute miles.

FIG. 5 is an alternative structure of FIG. 4, whereby high speed taxiways are disposed between the runways and the apron 13C; and, these taxiways and runways are clear channel type, no crossings, no intersections, no double uses, no obstructions to variable one way approach or departure operations.

Its taxi speed can be higher than that of FIG. 4 although its construction costs will be higher. Its number of runways can be increased. Its apron is designated as 13C because it is not bound by tangential taxiways. Taxiways 20 are high speed type without intersections. Connections 21 are connections or joinings of runways with their respective taxiways. These connections may be any usual type, such as common expansion joints and may have a bigger turn radius than shown.

FIG. 5 readily adapts to modifying prior art parallel runway airfields to one way airports for doubling their capacity only by closing all the taxiways supporting the two way runways always found at big parallel runway airfields.

The foregoing disclosure of the preferred embodiments is illustrative of the broad inventive concepts comprehended by the invention.

What is claimed is:

1. An airport facility providing for at least one stream of aircraft to obtain safe, efficient and short transit distances throughout aircraft approach, taxi and departure operations, comprising:
a taxiing surface on which the aircraft moves during the taxi operation and including an apron surface around the perimeter of said taxing surface;
plural runways with one end of each said runways connected to the perimeter of said apron, the runways arranged around the apron in a radiating configuration;

said runways grouped in pairs of one landing and one takeoff runway, with their centerlines oriented substantially parallel and laterally spaced on substantially opposite sides of said taxiing surface;

said taxing surface further comprising aviation support buildings radially oriented thereon in an arrangement that forms a straight access taxi passageway between the ends of said runways in each of said pairs of runways, the passageways communicating with the buildings for docking the at least one stream of aircraft while taxiing from the landing to the take-off runway in a one way path;

said runways are clear of intersections with other said runways and their centerlines angularly displaced from the radial orientation of said support buildings.

2. The airport in claim 1, wherein;
a taxiway, said taxiing surface still further comprises at least one said taxiway disposed between at least one of said plural runways and the perimeter of said apron remotely displacing said at least one plural runways.

3. The airport in claim 1, further comprising;
a taxiway, at least one of said plural runways displaced from connection at the perimeter of said apron by disposing at least one said taxiway arranged for connection between said at least one displaced runway and the perimeter.

4. A method of controlling at least one stream of aircraft on an airport facility comprising, a taxiing surface including an apron surface around the perimeter of said taxiing surface, plural runways with one end of each said runways connected to the perimeter of said apron, the runways arranged around said apron in a radiating configuration, said runways grouped in pairs of one landing and one takeoff runway with their centerlines oriented substantially parallel and laterally spaced on substantially opposite sides of said taxiing surface, which comprises the operation of:

landing the aircraft on the landing runway in at least one of said pairs of runways in a one way path made in direction toward said taxiing surface comprising aviation support buildings radially oriented thereon in an arrangement that forms a straight access taxi passageway between the ends of said runways in each of said pairs of runways, the passageways communicating with the buildings for docking the at least one stream of aircraft while taxiing from the landing to the takeoff runway in a one way path;

taxiing the aircraft on the taxi passageway in at least one of said pairs of runways in a one way path in generally one direction from the landing runway to the takeoff runway while docking the aircraft, said runways are clear of intersections with other said runways and their centerlines angularly displaced from the radial orientation of said support buildings; and, taking off the aircraft on the take-off runway in at least one of said pairs of runways in a one way path in generally the same direction of the landing and taxiing operations resulting in short, efficient and safe aircraft transit by the at least one stream of aircraft in the one way path throughout all the operations.

5. The method as recited in claim 4, wherein;
the operation of taxiing the aircraft includes taxiing the aircraft in the one way path on at least one remoting taxiway with one end connected to the perimeter of said apron and the other end connected in arrangement to remotely displace at least one of said plural runways from said apron perimeter.

* * * * *